(12) United States Patent
Katoh et al.

(10) Patent No.: US 10,765,998 B2
(45) Date of Patent: Sep. 8, 2020

(54) THREE-WAY CATALYST FOR PURIFYING GASOLINE ENGINE EXHAUST GAS

(71) Applicant: N.E. CHEMCAT CORPORATION, Tokyo (JP)

(72) Inventors: Takuya Katoh, Tokyo (JP); Akito Takayama, Tokyo (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 16/302,749

(22) PCT Filed: Apr. 11, 2017

(86) PCT No.: PCT/JP2017/014825
§ 371 (c)(1),
(2) Date: Nov. 19, 2018

(87) PCT Pub. No.: WO2017/203863
PCT Pub. Date: Nov. 30, 2017

(65) Prior Publication Data
US 2019/0314761 A1   Oct. 17, 2019

(30) Foreign Application Priority Data
May 25, 2016   (JP) .................. 2016-103974

(51) Int. Cl.
*B01J 23/63*   (2006.01)
*B01J 35/04*   (2006.01)
(Continued)

(52) U.S. Cl.
CPC ............ *B01D 53/945* (2013.01); *B01J 23/63* (2013.01); *B01J 35/04* (2013.01); *B01J 37/0225* (2013.01);
(Continued)

(58) Field of Classification Search
CPC . B01J 23/63; B01J 35/04; F01N 3/101; F01N 3/281
See application file for complete search history.

(56) References Cited

U.S. PATENT DOCUMENTS 5,019,546 A   5/1991  Murakami et al.
5,597,771 A * 1/1997  Hu .................... B01D 53/945
                                              502/304
(Continued)

FOREIGN PATENT DOCUMENTS

EP   1308200 A1   5/2003
EP   1900427 A1   3/2008
(Continued)

OTHER PUBLICATIONS

International Preliminary Report on Patentability (Form PCT/IB/373) issued in counterpart International Application No. PCT/JP2017/014825 dated Nov. 27, 2018 with Form PCT/ISA/237, with English translation. (11 pages).
(Continued)

*Primary Examiner* — Cam N. Nguyen
(74) *Attorney, Agent, or Firm* — Westerman, Hattori, Daniels & Adrian, LLP

(57) ABSTRACT

A three-way catalyst for purifying exhaust including noble metal components, enables sintering of the noble metal to be suppressed even at high temperature, enables carbon monoxide (CO), hydrocarbons (HC), and nitrogen oxides (NOx) to be removed and a method for purifying exhaust gas. A carrier having a honeycomb structure is coated with two or more layers of the catalyst compositions, an upper layer including a heat resistant inorganic oxide supporting Pd and a La-containing oxide, a lower layer including a heat resistant inorganic oxide supporting Rh. The content of La in terms of $La_2O_3$ is 9.6 g/L to 23 g/L, the content of Ce in
(Continued)

terms of $CeO_2$ is 5 g/L to 20 g/L, and the content of Ba in terms of BaO is 1.2 g/L or less per unit volume of the honeycomb structure.

11 Claims, 6 Drawing Sheets

(51) Int. Cl.
| | | |
|---|---|---|
| F01N 3/10 | (2006.01) | |
| F01N 3/28 | (2006.01) | |
| B01D 53/94 | (2006.01) | |
| B01J 37/02 | (2006.01) | |
| B01J 37/08 | (2006.01) | |

(52) U.S. Cl.
CPC ....... *B01J 37/0236* (2013.01); *B01J 37/0244* (2013.01); *B01J 37/08* (2013.01); *F01N 3/101* (2013.01); *F01N 3/281* (2013.01); *B01D 2255/1023* (2013.01); *B01D 2255/1025* (2013.01); *B01D 2255/2042* (2013.01); *B01D 2255/2063* (2013.01); *B01D 2255/2065* (2013.01); *B01D 2255/20715* (2013.01); *B01D 2255/407* (2013.01); *B01D 2255/9022* (2013.01); *B01D 2255/9155* (2013.01)

(56) References Cited

U.S. PATENT DOCUMENTS

| | | | | |
|---|---|---|---|---|
| 5,958,828 | A | 9/1999 | Murakami et al. | |
| 6,967,186 | B2* | 11/2005 | Takaya | B01D 53/945 502/302 |
| 7,517,510 | B2* | 4/2009 | Chen | B01D 53/945 422/168 |
| 7,550,124 | B2* | 6/2009 | Chen | B01D 53/945 423/213.2 |
| 7,749,472 | B2* | 7/2010 | Chen | B01D 53/945 423/213.2 |
| 7,758,834 | B2* | 7/2010 | Chen | B01D 53/945 423/213.2 |
| 7,759,283 | B2* | 7/2010 | Yamato | B01D 53/944 502/261 |
| 8,038,951 | B2* | 10/2011 | Wassermann | B01J 21/066 422/168 |
| 8,039,418 | B2* | 10/2011 | Kitamura | B01D 53/925 423/213.5 |
| 8,153,549 | B2* | 4/2012 | Cho | B01D 53/945 502/300 |
| 8,227,374 | B2* | 7/2012 | Sato | B01D 53/945 502/100 |
| 8,568,675 | B2* | 10/2013 | Deeba | B01D 53/945 423/213.5 |
| 8,663,588 | B2* | 3/2014 | Lindner | B01D 53/945 423/213.5 |
| 8,667,785 | B2* | 3/2014 | Blakeman | B01J 35/0006 60/299 |
| 8,950,174 | B2* | 2/2015 | Hilgendorff | B01J 23/58 423/213.2 |
| 9,005,559 | B2* | 4/2015 | Sumiya | B01J 29/7007 423/213.2 |
| 9,656,209 | B2* | 5/2017 | Chang | B01D 53/945 |
| 2011/0047975 | A1 | 3/2011 | Nakayama et al. | |

FOREIGN PATENT DOCUMENTS

| | | |
|---|---|---|
| JP | 63-39633 A | 2/1988 |
| JP | 2-214540 A | 8/1990 |
| JP | 5-237390 A | 9/1993 |
| JP | 6-75675 B2 | 9/1994 |
| JP | 8-229395 A | 9/1996 |
| JP | 2002-273226 A | 9/2002 |
| JP | 2002-326033 A | 11/2002 |
| JP | 2004-223403 A | 8/2004 |
| JP | 2009-162145 A | 7/2009 |
| JP | 2009-293538 A | 12/2009 |
| JP | 5322526 B2 | 10/2013 |
| JP | 2014-18723 A | 2/2014 |
| WO | 2000/027508 A1 | 5/2000 |

OTHER PUBLICATIONS

International Search Report dated Jul. 18, 2017, issued in counterpart application No. PCT/JP2017/014825, w/English translation (6 pages).

Extended European Search Report, dated Jan. 3, 2020, issued in counterpart European Patent Application No. 17802463.4 (in English; 6 pages).

* cited by examiner

THREE-WAY CATALYST FOR PURIFYING GASOLINE ENGINE EXHAUST GAS

TECHNICAL FIELD

The present invention relates to a three-way catalyst for purifying gasoline engine exhaust gas and more specifically to a three-way catalyst for purifying gasoline engine exhaust gas, having high removal rates of carbon monoxide (CO), hydrocarbons (HC), and nitrogen oxides (NOx) even when the temperature of a catalyst bed soon after engine start-up is relatively low.

BACKGROUND ART

A three-way catalyst (TWC) has been used to purify exhaust gas exhausted from a gasoline-powered vehicle and including HC, CO, and NOx. The TWC serving as an exhaust gas purification catalyst is usually designed such that the TWC exhibits high activity when the concentrations of HC, CO, NOx, and the like and the concentration of oxygen are in specific ranges (also referred to as a window). Buffering of change in the oxygen concentration exhibits action for retaining such a window range and is useful for removing hazardous components in the exhaust gas with high efficiency.

These HC and CO in the exhaust gas are oxidized by platinum group metals such as platinum (Pt), palladium (Pd), and rhodium (Rh). The platinum group metal serving as the catalyst component is supported on a heat resistant inorganic oxide having a high surface area such as activated alumina in a highly dispersed manner and coats a honeycomb structure type carrier in the form of catalyst composition slurry together with other catalyst materials (refer to Patent Literature 1).

Pt, which is an oxidizing active species, has particularly high activity and still exhibits high purification performance even with poisoning of Pt or particle growth. Therefore, Pt has been widely used as a catalyst for purifying exhaust gases exhausted from internal combustion engines of automobiles or the like. Reduction in the amount of Pt used, however, has been studied from the viewpoint of resource protection and cost.

As a solution for reducing the amount of Pt used, replacing at least a part of Pt with Pd has been studied. Although both Pt and Pd are active species having an oxidizing function, Pd causes significant deterioration in the activity due to poisoning by sulfur and the like or particle growth. Pd is more easily alloyed when used in combination with Rh than when Pt is used. Under severe conditions such as high temperature oxidizing atmosphere, particles of Pd are grown and performance may deteriorate due to unfavorable interaction with co-catalyst components or poisoning components in exhaust gas. Therefore, Pd is used with a component suppressing to poisoning, sintering, particle growth, and alloying (refer to Patent Literature 2 and Patent Literature 3).

The exhaust gas from automobiles contains various reactive components and has high temperature, and thus the exhaust gas purification catalyst components are easily sintered to cause poisoning. In the exhaust gas purification catalyst, the major part of its purification active species is a noble metal and thus reduction in poisoning of the noble metal and suppression of sintering are important problems. Various solutions have been studied for these problems.

NOx such as NO and $NO_2$ in exhaust gas are air pollutants and $N_2O$ is a greenhouse gas promoting global warming. Therefore, government organizations in various countries execute various regulations on emission of NOx.

Rh is used as the catalytically active species for the removal of NOx. Rh, however, is a material that may cause alloying when Rh is used with Pd in the same composition (refer to Patent Literature 2). When Rh is used together with Pt and Pd, which are oxidizing active species, in the same catalyst composition, the oxidation performance and the reduction performance may be canceled out. Therefore, coating a honeycomb structure type carrier with Rh, Pt, and Pd individually as different catalyst compositions has been studied.

In addition to the active species as described above, co-catalyst components selected from an oxygen storage and release material (hereinafter may be referred to as OSC (oxygen storage component)), a barium (Ba) component, and inorganic oxides such as zirconia, silica, titania, alumina, and zeolite are frequently employed as the exhaust gas purification catalyst. This OSC stores oxygen when the oxygen concentration in the exhaust gas is high and releases oxygen when the oxygen concentration in the exhaust gas is low. A change in the oxygen concentration in the exhaust gas is buffered by the storage and release of oxygen and the oxygen concentration (window range) suitable for purification of the exhaust gas can be controlled.

When the oxygen concentration in the exhaust gas is low, the oxidation of HC and CO is difficult to promote. In such a case, OSC supplies oxygen into the exhaust gas, oxidizes HC and CO, and functions to promote exhaust gas purification. Such an action may be referred to as an oxidation-reduction reaction. When OSC having high oxygen supply and storage speed is used, a catalyst having excellent HC and CO removal capability tends to be obtained. Cerium-zirconium composite oxide is known as OSC having high oxygen storage and release speed (refer to Patent Literature 4).

The conceivable reason why the storage and release speed of oxygen is fast is that the cerium-zirconium composite oxide has a stable crystal structure in both heat and oxidation reduction, does not inhibit the function of the cerium oxide serving as the main component of OSC, and can be used for functioning as OSC to the inside of the particles.

In the exhaust gas purification catalyst, the Ba component is usually used as a co-catalyst component. The Ba component has a function of adsorbing NOx in the exhaust gas. More specifically, in the case that the Ba component is $BaCO_3$, $BaCO_3$ reacts with NOx to be $Ba(NO_3)_2$ when the NOx concentration in the exhaust gas increases. Such a reaction with NOx may be referred to as adsorption of NOx or storage of NOx.

Generally, NOx is generated in a large amount when the amount of fuel supplied to an engine is relatively smaller than the amount of air. The Ba component temporarily stores NOx thus generated. When NOx is stored by the Ba component, the concentration of NOx in the exhaust gas decreases, and when the CO concentration increases, NOx is released from the Ba component. This is because $Ba(NO_3)_2$ reacts with CO to be $BaCO_3$. NOx released from the Ba component reacts with reducing components in the exhaust gas on the surface of the active component such as Rh and is reduced and removed. Such storage and release of NOx with the Ba component are referred to as storage and release due to the chemical equilibrium of the Ba component.

In addition to such OSC and Ba components, zirconia is frequently used as a co-catalyst component. Zirconium is a transition metal and zirconia, which is an oxide of zirconium, also has oxygen storage and release capability. Therefore, zirconium oxide may be used as OSC. Zirconium oxide, however, is believed to have not so high capability as OSC, as compared with cerium oxide.

Zirconia rather improves the NOx removal performance by promoting steam reforming reaction. Consequently, it has been conceivable that steam reforming reaction is promoted as follows (refer to Patent Literature 5) by using zirconia together with the Rh component in TWC.

$$HC + H_2O \rightarrow COx + H_2 \quad (1)$$

$$H_2 + NOx \rightarrow N_2 + H_2O \quad (2)$$

It has been known that such a steam reforming reaction proceeds in a relatively high temperature atmosphere. A catalyst having a high NOx removal capability even at low temperature, however, is desired.

For the removal of NOx in the exhaust gas, a method of directly utilizing reducing components in the exhaust gas is included, in addition to a method for utilizing hydrogen generated by the above steam reforming reaction. One of these reducing components includes carbon monoxide (CO). The removal of NOx using CO is referred to as CO—NO reaction and it has been known that this reaction proceeds even at relatively low temperature (for example, Patent Literature 6). However, no specific means that satisfies the market requirements for the removal efficiency of NOx by the CO—NO reaction has been developed.

Under such circumstances, the present applicant has developed a honeycomb structure type catalyst in which a carrier is coated with two or more layers of catalyst compositions to remove carbon monoxide, hydrocarbons, and nitrogen oxides contained in exhaust gas, the upper layer side catalyst layer contains palladium supported on a heat resistant inorganic oxide, an oxygen storage and release material, and a barium component, and the lower layer side catalyst layer contains rhodium supported on a cerium-zirconium composite oxide having an cerium-zirconium weight ratio in terms of oxides of 0.05 to 0.2 (refer to Patent Literature 7).

Such development enabled the present applicant to provide a catalyst that exhibits excellent exhaust gas purification performance capable of meeting the various regulations, is inexpensive, and has less deterioration in the purification performance even after long-term use. However, the removal rates of carbon monoxide (CO) and nitrogen oxide (NOx) have been particularly low during a period when the temperature of the catalyst bed soon after the engine start-up is relatively low.

Therefore, in order to obtain a catalyst having high NOx removal capability even at low temperature, a catalyst having a high [CO+NO] reaction capability, that is, a three-way catalyst having high removal rates of carbon monoxide (CO) and nitrogen oxides (NOx) even during the period when the temperature of the catalyst bed is relatively low and having relatively low cost has been required.

CITATION LIST

Patent Literature

[Patent Literature 1] Japanese Unexamined Patent Application Publication No. H5-237390

[Patent Literature 2] Japanese Unexamined Patent Application Publication No. 2002-326033

[Patent Literature 3] Japanese Unexamined Patent Application Publication No. 2004-223403

[Patent Literature 4] Japanese Examined Patent Application Publication No. H6-75675

[Patent Literature 5] International Publication No. 2000/027508

[Patent Literature 6] Japanese Unexamined Patent Application Publication No. 2002-273226, FIG. 11

[Patent Literature 7] Japanese Patent 5322526

SUMMARY OF INVENTION

Technical Problem

In view of the above conventional problems, an object of the present invention is to provide a three-way catalyst for purifying gasoline engine exhaust gas (hereinafter, also referred to as a three-way catalyst or TWC) having the high removal rates of carbon monoxide (CO), hydrocarbons (HC), and nitrogen oxides (NOx), in particular having excellent removal performance of CO and NOx even when the temperature of a catalyst bed soon after the engine start-up is relative low.

Solution to Problem

In order to solve the above problems in the conventional art, the inventors of the present invention have conducted intensive research and have completed the present invention in which two or more layers of the catalyst compositions coat a carrier having a honeycomb structure, an upper layer including a heat resistant inorganic oxide supporting Pd and a La-containing oxide, a lower layer including a heat resistant inorganic oxide supporting Rh, each of the content of La and the content of Ce supported on the honeycomb structure is set to specific amounts, and Ba is not contained or the content of Ba is a specific amount or smaller.

Namely, a first aspect of the present invention provides a three-way catalyst for purifying gasoline engine exhaust gas including catalyst compositions to remove carbon monoxide, hydrocarbons, and nitrogen oxides included in the gasoline engine exhaust gas.

A carrier having a honeycomb structure is coated with two or more layers of the catalyst compositions, an upper layer including a heat resistant inorganic oxide supporting Pd and a La-containing oxide, a lower layer including a heat resistant inorganic oxide supporting Rh. The content of La in terms of $La_2O_3$ is 9.6 g/L to 23 g/L, the content of Ce in terms of $CeO_2$ is 5 g/L to 20 g/L, and the content of Ba in terms of BaO is 1.2 g/L or less per unit volume of the honeycomb structure.

A second aspect of the present invention provides the three-way catalyst for purifying gasoline engine exhaust gas as described in the first aspect, in which the La-containing oxide is included in the upper layer alone and the content of La in terms of $La_2O_3$ is 9.6 g/L to 20 g/L.

A third aspect of the present invention provides the three-way catalyst for purifying gasoline engine exhaust gas as described in the first aspect, in which the heat resistant inorganic oxides in the upper layer is one or more heat resistant inorganic oxides selected from γ-alumina, γ-alumina to which La is added, ceria, cerium-zirconium composite oxide, or cerium-zirconium composite oxide to which La is added.

A fourth aspect of the present invention provides the three-way catalyst for purifying gasoline engine exhaust gas as described in the first aspect, in which the content of Pd is 0.1 [g/L] to 12 [g/L] per unit volume of the honeycomb structure.

A fifth aspect of the present invention provides the three-way catalyst for purifying gasoline engine exhaust gas as described in the first aspect, in which the content of Ba in terms of BaO is less than 0.1 [g/L] per unit volume of the honeycomb structure.

A sixth aspect of the present invention provides the three-way catalyst for purifying gasoline engine exhaust gas as described in the first aspect, in which the upper layer includes the cerium-zirconium composite oxide in a content of 1 [g/L] to 50 [g/L] per unit volume of the honeycomb structure.

A seventh aspect of the present invention provides the three-way catalyst for purifying gasoline engine exhaust gas as described in the first aspect, in which the content of Rh is 0.01 [g/L] to 3 [g/L] per unit volume of the honeycomb structure.

An eighth aspect of the present invention provides the three-way catalyst for purifying gasoline engine exhaust gas as described in the first aspect, in which the lower layer includes the cerium-zirconium composite oxide in a content of 5 [g/L] to 100 [g/L] per unit volume of the honeycomb structure.

Moreover, a ninth aspect of the present invention provides the three-way catalyst for purifying gasoline engine exhaust gas as described in the first aspect, in which any of the upper layer and the lower layer does not include Ba and the upper layer does not include Rh.

Effects of the Invention

The three-way catalyst for purifying gasoline engine exhaust gas of the present invention includes rhodium (Rh component) in the lower layer and palladium (Pd component) in the upper layer, and does not include the Ba component or includes a remarkably small amount of Ba component. At the same time, the catalyst includes the heat resistant inorganic oxide containing cerium oxide and the lanthanum oxide in specific amounts. Consequently, the catalyst exhibits excellent purification performance to the purification of the exhaust gas exhausted from a gasoline engine by promoting reaction of CO and NOx even at a low temperature. In other words, the catalyst exhibits remarkable removal performance of CO and NOx at low temperature and is an excellent three-way catalyst in practical temperature range.

DESCRIPTION OF EMBODIMENTS

Hereinafter, the three-way catalyst for purifying gasoline engine exhaust gas of the present invention will be described in detail. The three-way catalyst of the present invention is specified to TWC applications. The three-way catalyst, however, is not limited to the TWC applications and is also applicable to the exhaust gas exhausted from a combustion engine using fossil fuel such as diesel vehicles by adequately changing treatment conditions, as long as the object of the present invention is not impaired.

As long as applicable laws and regulations permit, the contents of Japanese Patent Application No. 2016-103974, which is a Japanese patent application, and the contents of all the documents cited in this specification are used as a part of the description of the present specification.

1. Layer Constitution of Catalyst

The three-way catalyst for purifying gasoline engine exhaust gas of the present invention is made of two or more layers of the catalyst compositions coating a honeycomb structure, and the Pd component and Rh component are included as noble metal active species to reduce NOx by the CO—NO reaction.

In the present invention, the Pd component and the Rh component form each of the catalyst layers different from each other onto the honeycomb structure. When the Pd component and the Rh component are used in the same composition, these components may form an alloy and thus both alloyed metals may cancel the activity of each other and deteriorate the activity. The Rh component and the Pd component are arranged in different layers, whereby a decrease in activity of each of the Rh component and the Pd component due to alloying can be suppressed. In the present invention, the Pd component is arranged in the upper layer and the Rh component is arranged in the lower layer.

By arranging the Pd component in the upper layer on the exhaust gas flow side, the Rh component in the lower layer can be protected from HC, S, and P, which are the poisoning components in the exhaust gas, and the Rh component, which is the main activated species against NOx and exhaust of which is strictly regulated can be protected.

Figure 2:
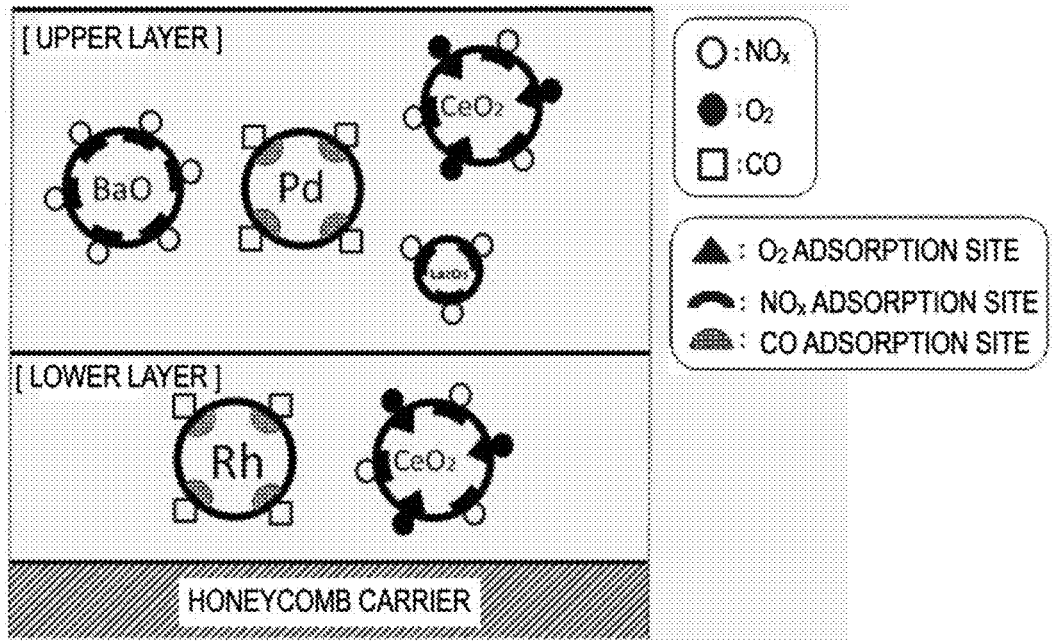
FIG. 2 includes explanatory views schematically illustrating the CO—NO reaction mechanism when the exhaust gas is treated using a conventional three-way catalyst to which Ba is added in a large amount at (A) a relatively low temperature of lower than 200° C. and at (B) a higher temperature of 200° C. or higher.
Figure 2:
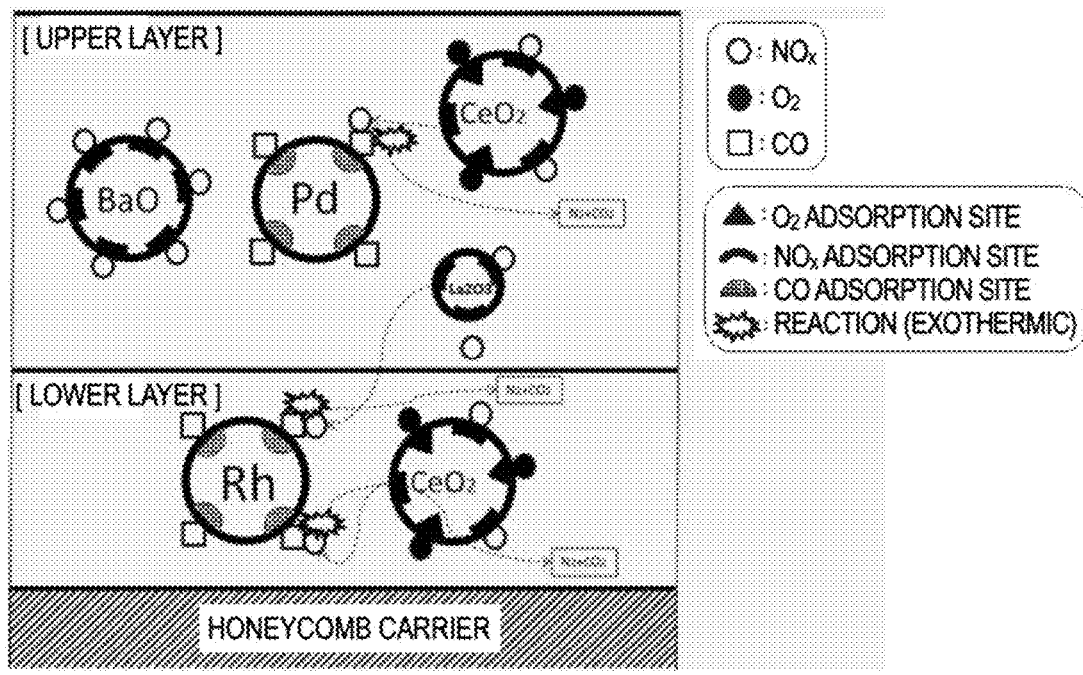

Various reactions proceed in the three-way catalyst. Although NOx in the exhaust gas is composed of various components such as NO, $NO_2$, and $N_2O$, the composition amount of NO is the largest. Conventionally, in a three-way catalyst that is generally known, BaO is used as a main NOx storage material as illustrated in FIG. 2(A) and the content of $La_2O_3$ is not so high, even when $La_2O_3$ is contained. Such a small amount of $La_2O_3$ originated from rare earths of OSC or originated from alumina or the like used in catalysts may be contained in conventional catalysts.

Such conventional catalysts have insufficient performance in purifying exhaust gas exhausted from a gasoline engine at low temperature. The reason is as follows. NOx, CO, and $O_2$ are in a state where these substances are adsorbed or stored in the components in the catalyst as illustrated in FIG. 2(A) illustrating a state where the catalyst temperature is lower than 200° C.

Thereafter, when the catalyst temperature rises to higher than 200° C., as illustrated in FIG. 2(B), desorption of NO from $CeO_2$—$ZrO_2$ and $La_2O_3$ starts. NO desorption from BaO, however, has not started yet. The amount of $La_2O_3$ is also small and thus the amounts of NO supplied to Pd and Rh are also small. Therefore, the CO—NO reaction on the adsorption sites of Pd and Rh is difficult to promote.

Moreover, the calorific value due to the reaction between NO and CO is also small and thus the rise in catalyst temperature is slow and NO removal performance by Pt and Pd is difficult to achieve. In order to exhibit high NO removal performance, it is necessary to wait until the temperature at which NO can be released from BaO (approximately 300° C.). During that period, a large amount of NO will be exhausted into the atmosphere.

In contrast to such conventional catalysts, in the present invention, BaO is not used or the amount of BaO used is extremely small, and a larger amount of $La_2O_3$ is used.

Here, reference is made to the result of testing the ease of desorption of NOx using an evaluation sample in which La, Ba, and Ce each are added to alumina as oxides in an amount of 10 mol %. The evaluation sample is tested after being exposed to a durable condition at 1,050° C. for 12 hours in nitrogen gas containing 10% by volume of $H_2O$. When $NO_2$ is adsorbed at 100° C. and the temperature of the sample is raised to 600° C. in He flow, the desorption performance of NOx has insignificant difference until about 150° C. and high desorption performance of NOx from La and Ce is observed in a range of about 200° C. to about 370° C. The peaks of the desorption performance of NOx from La and Ce exist at 340° C. and 410° C., respectively, whereas the peak of the desorption performance of NOx from Ba exists at 450° C., which exists in higher temperature and indicates gentle trend.

From this point of view, in the present invention, the content of La in terms of $La_2O_3$ is set to 9.6 g/L to 23 g/L, the content of Ce in terms of $CeO_2$ is set to 5 g/L to 20 g/L, and the content of Ba in terms of BaO is set to 1.2 g/L or less per unit volume of the honeycomb structure.

Preferably, the content of La in terms of $La_2O_3$ arranged in the upper layer is 9.6 g/L to 20 g/L, the content of Ce in terms of $CeO_2$ is 7 g/L to 18 g/L, and the content of Ba in terms of BaO is 1.0 g/L or less. More preferably, La in an amount of 10 g/L to 18 g/L is contained in terms of $La_2O_3$ arranged in the upper layer.

2. Catalyst in Upper Layer

In the upper layer of the three-way catalyst of the present invention, a heat resistant inorganic oxide base material such as alumina, ceria, and zirconia supporting the Pd component and La oxide are included.

(Pd Component)

The noble metal component contained in the upper layer is the component containing Pd as described above. The Pd component may be metal Pd. Preferably, a part of the Pd component is converted into palladium oxide by calcining the metal Pd during the manufacturing process described below or oxidizing the metal Pd in the purifying process of the exhaust gas.

The activity of such Pd component may be deteriorated due to poisoning by poisoning substances such as sulfur. Pd, however, is often relatively inexpensive because the amount of reserves in the earth crust is larger than those of Pt and Rh and thus a relatively large amount of the Pd component can be used to provide against loss of the activity. The catalyst of the present invention is TWC for gasoline engines and deterioration in activity to such exhaust gas from an engine using gasoline having a low sulfur content as a fuel may be small. Consequently, the catalyst of the present invention can be inexpensive and can achieve high performance. Pt is a component having lower melting point in a state of oxide and may cause volatilization under high temperature. When Pt is used as the oxidizing active species in the surface layer, Pt may volatilize due to the heat of the exhaust gas and be released into the atmosphere.

When the upper layer is exposed to high temperature exhaust gas, sintering and particle growth of the metal components may occur. The particle-grown metal component decreases its surface area and the catalytic activity decreases. In order to compensate the decrease in the catalytic activity due to such particle growth, a large amount of a metal component that is able to retain a sufficient surface area even after the particle growth occurs is required. Here, when the metal component is Pd, the amount of Pd to be used is easily increased in many cases and can be used in a large amount. Even when the Pd particles grow and the surface area decreases, the catalyst layer exhibits sufficient purification performance.

The amount of Pd component is set to 0.1 [g/L] to 20 [g/L] in terms of metal Pd per unit volume of the honeycomb structure. Considering the suppression of sintering on the base material and the catalytic effect, the amount is more preferably 0.3 [g/L] to 12 [g/L] and further preferably 1 [g/L] to 6 [g/L].

(Heat Resistant Inorganic Oxide Base Material)

In the present invention, the heat resistant inorganic oxide base material supporting the Pd component is appropriately selected from alumina, ceria, zirconia, titania, silica, zeolite, or composite oxides, such as silica-alumina, containing at least one of these inorganic oxides. Of these substances, alumina, ceria, and zirconia are preferable as the base material of the Pd component.

As the alumina, in order to have excellent heat resistance and retain the active species in a highly dispersed state even for long-term use, γ-alumina having a high specific surface area is preferable. In order to improve the heat resistance, La may be added. γ-Alumina has high heat resistance, is porous, and has a large specific surface area value. Consequently, γ-alumina has excellent dispersibility of Pd component.

The specific surface area value (measured by the BET method; hereinafter, the same method will be employed) of such γ-alumina is preferably 80 $m^2$/g to 250 $m^2$/g and more preferably 100 $m^2$/g to 250 $m^2$/g. When the specific surface area value of γ-alumina is 250 $m^2$/g or smaller, the catalyst is rich in heat resistance. When the specific surface area value is 80 $m^2$/g or larger, the noble metal component can be stabilized in a highly dispersed state. γ-alumina also exhibits an effect as a binder and thus peeling of the catalyst component can also be prevented when the catalyst component coats the honeycomb structure. Therefore, γ-alumina may be used not as the base material but used alone as a binder The base material is made to contain OSC such as cerium oxide, cerium-zirconium composite oxide, and cerium-zirconium composite oxide to which La is added. By containing OSC, the oxidation activity is improved in an exhaust gas atmosphere having the low concentration of oxygen and the high concentrations of HC and CO. In the present invention, the Pd component is preferably supported on a mixture of alumina and cerium oxide or OSC such as cerium-zirconium composite oxide.

The content of cerium oxide in the entire catalyst is 5 [g/L] to 20 [g/L] in terms of $CeO_2$ per unit volume of the honeycomb structure. In this content, the amount in the upper layer is preferably 50% or smaller and more preferably 40% or smaller of the entire amount of cerium oxide. Ce has the function as the OSC material and thus the content of Ce is determined so that the amount of stored oxygen is secured and the timing of oxygen release does not become excessively late.

When cerium-zirconium composite oxide is used in combination with γ-alumina and by mixing both of the substances, heat resistance and high dispersibility by γ-alumina and OSC performance of cerium-zirconium composite oxide are exhibited at the same time. Consequently, the activity of the Pd component is improved.

The cerium-zirconium composite oxide is not particularly limited by the cerium content. The cerium-zirconium composite oxide having a cerium/zirconium ratio in terms of oxide of 0.5 to 0.9:1 is preferable. By using OSC containing such an amount of cerium, storage and release of oxygen can be carried out quickly in the upper layer and oxidation of HC and CO by the Pd component can be promoted. The cerium-zirconium composite oxide may contain alkali metals, alkaline earth metals, transition metals, or rare earth metals other than cerium, if necessary.

As the cerium-zirconium composite oxide, a commercially available product can be used. The cerium-zirconium composite oxide is not particularly limited in its production method. The cerium-zirconium composite oxide is generally obtained by mixing a cerium raw material and a zirconium raw material and calcining these raw materials. The cerium raw material is not particularly limited. Various kinds of cerium salts such as nitrate, carbonate, sulfate, acetate, chloride, and bromide or cerium oxide can be used. The zirconium raw material is not particularly limited, either. Various zirconium salts such as nitrate, carbonate, sulfate, acetate, chloride, and bromide or zirconium oxide, badelite, desilicated zirconia, and the like can be used.

In consideration of the content of the cerium oxide of the entire catalyst, as the content [g/L] of the cerium-zirconium composite oxide in terms of the oxide per unit volume of the honeycomb structure, the amount is preferably 1 [g/L] to 100 [g/L]. The amount is more preferably 3 [g/L] to 50 [g/L] and particularly preferably 5 [g/L] to 20 [g/L].

When the amount is within this range, a sufficient amount of NOx can be adsorbed on the catalyst surface at a low temperature of the catalyst. Cerium-zirconium composite oxide also functions as OSC as described above. Therefore, the amount of oxygen that can be stored is sufficient when the amount of cerium-zirconium composite oxide is adequate and thus change in the oxygen concentration in the exhaust gas can be buffered. Consequently, the oxygen concentration (window range) in which the catalyst is able to exhibit good activity as a three-way catalyst can be retained. When the amount of cerium-zirconium is adequate, the CO—NO reaction proceeds by oxygen supplied from OSC without consuming CO in the exhaust gas.

In other words, the cerium-zirconium composite oxide has the action of supplying oxygen. Therefore, cerium-zirconium composite oxide is used with caution in that the activity of the cerium-zirconium composite oxide increases at a high temperature and the cerium-zirconium composite oxide oxidizes the catalytically active species in a high activity state to deteriorate the activity.

The total amount of the heat resistant inorganic oxide in the upper layer is preferably 10 [g/L] to 100 [g/L], more preferably 30 [g/L] to 90 [g/L], and further preferably 40 [g/L] to 80 [g/L]. When the total amount is within this range, the sections of the through holes of the honeycomb are not narrowed due to the thickness of the catalyst layer in the honeycomb structure and thus the back pressure does not rise and the output does not decrease. When the total amount is within this range, the dispersed state of the Pd component does not deteriorate and the activity of the catalyst does not decrease.

(Lanthanum Oxide)

In the present invention, lanthanum oxide exists in the upper layer. La may be added to the inorganic oxide base material in order to improve the heat resistance of the base material. In addition to this, in the present invention, lanthanum oxide in which the metal element is La alone is preferably contained. Lanthanum oxide promotes the reaction of CO and NOx together with the cerium oxide to generate heat even in an atmosphere having a low catalyst bed temperature, resulting in improving the exhaust gas purification activity.

The New European Driving Cycle (hereinafter referred to as NEDC) mode is a mode in which measurement is carried out from a cold state of the engine under severe conditions such as high speed and high number of stops as compared with the conditions of the JC08 mode.

With regard to the vehicle speed/temperature change in the NEDC mode, the engine exhaust temperature reaches 200° C. in about 5 seconds from the engine start-up. The temperature of the catalyst bed, however, is only about 50° C. Thereafter, when the catalyst bed temperature reaches about 200° C., lanthanum oxide desorbs NOx together with Ce oxide to cause the reaction of CO and NO, resulting in increase in the calorific value. The catalyst bed temperature rises promptly by the heat generation to activate the catalyst. This activation improves not only the purification by the CO—NO reaction but also the removal performance of all of CO, NOx, and HC.

The content of lanthanum oxide in terms of $La_2O_3$ in the entire catalyst is 9.6 [g/L] to 23 [g/L] and preferably 10 [g/L] to 20 [g/L] per unit volume of the honeycomb structure. In this content, the amount in the upper layer is preferably 70% or larger and more preferably 80% or larger. When La is added in this range, the heat resistance of the material can be improved, the amount of NOx necessary for the CO—NO reaction can be supplied, and the heat resistance of the material is also sufficient. Phase change of alumina or the OSC material is not caused and heat resistance does not deteriorate.

(Ba Component)

The three-way catalyst of the present invention contains the Pd component and does not contain the Ba component or contains a remarkably small amount of BaO of 1.2 g/L or smaller per unit volume of the honeycomb structure in the upper layer.

The Ba component stores NOx by turning into barium nitrate in a state where the amount of NOx is large and the amount of CO is small (mainly in the state of lean), whereas releases the stored NOx by turning barium nitrate into barium carbonate in a state where the amount of NOx is small and the amount of CO is large (mainly in the state of rich). In such an atmosphere in which NOx is released, the exhaust gas frequently contains abundant reducing components such as HC and CO. The released NOx is removed with the Rh component by utilizing HC or CO, and hydrogen generated by the steam reforming reaction at a high temperature.

The Ba component frequently exists as barium oxide in the three-way catalyst. In preparing the catalyst composition slurry, however, the Ba component may be added in the form of other barium salt such as barium sulfate, barium carbonate, and barium nitrate or may be added as a composite containing barium oxide, barium sulfate, barium carbonate, or barium nitrate.

The activity as the catalyst may be improved in some cases by using the Ba component and the Pd component in the same composition. The conceivable reason is the fact that the sintering of the Pd component is suppressed by the Ba component. The Pd component is able to retain a large surface area and a catalyst having high activity can be obtained by the suppression of the sintering of the Pd component. The Ba component, which is an alkaline earth metal, acts as a NOx storage component. In the present invention, however, desorption of NOx is inhibited at a low temperature from the start of the engine start-up until the temperature of the catalyst bed reaches about 300° C. Therefore, the amount of the Ba component to be used is limited.

A small amount of the Ba component may be added with an expectation of the NOx storage function at high temperature. The amount of the Ba component is 1.2 [g/L] or smaller and more preferably 1.0 [g/L] or smaller in terms of oxide per unit volume of the honeycomb structure. Most preferably, the Ba component is not contained.

3. Catalyst in Lower Layer

In the three-way catalyst of the present invention, the Rh component and a heat resistant inorganic oxide supporting the Rh component can be used as a base material in the lower layer. In other words, examples of the base material include γ-alumina, ceria, and cerium-zirconium composite oxide, which are the same base materials as the base materials used in the upper layer.

(Rh Component)

The Rh component may exist in the form of metal Rh. However, a part of the Rh component may be converted into rhodium oxide by calcining the metal Rh during the manufacturing process described below or oxidizing the metal Rh in the purifying process of the exhaust gas.

Rh contained in the lower layer is an active species having higher activity than the activity of the Pd component contained in the upper layer. Thus, the activity can be exhibited even with a small amount as long as the particle diameter is small and the dispersion state is excellent. The amount of resource of Rh is smaller than that of Pd and Rh is more expensive than Pd. Therefore, rhodium is desired to be able to retain a high dispersion state. In the present invention, the Rh component is used in the lower catalyst layer having a low opportunity to be directly exposed to reactive components or high temperature gas.

More specifically, in the present invention, a large amount of Pd is used for the upper layer where sintering is easy to cause. Even when the particles of Pd grow, sufficient activity as a catalyst layer is exhibited, whereas expensive Rh is located in the lower layer, where sintering is difficult to occur, to retain the dispersed state of Rh and to prevent particle growth and thus the activity is retained. This structure is particularly effective in TWC where exhaust gas becomes at high temperature.

The amount of the Rh component is 0.05 [g/L] to 5 [g/L] in terms of metal Rh per unit volume of the honeycomb structure. In order to make sintering less likely to proceed on the base material and to sufficiently exhibit the removal action of NOx, the amount of Rh component is preferably 0.1 [g/L] to 1 [g/L].

The ratio of the Rh component in the lower layer to the Pd component in the upper layer is preferably Rh Component: Pd Component=1:0.5 to 1:30, more preferably 1:1 to 1:20, and more preferably 1:2 to 1:15 in the weight ratio in terms of metal.

The three-way catalyst for purifying gasoline engine exhaust gas of the present invention removes HC, CO, and NOx by the action of both Pd component and Rh component, and excellent HC, CO, and NOx removal performance is exhibited within such composition range.

(Heat Resistant Inorganic Oxide Base Material)

In the present invention, examples of the heat resistant inorganic oxide base material in the lower layer include alumina, ceria, zirconia, titania, silica, and zeolite. Of these base materials, alumina, ceria, and zirconia are preferable. In addition to using the heat resistant inorganic oxide alone, a heat resistant inorganic oxide may be appropriately selected from heat resistant inorganic oxides made of a composite oxide containing at least one of these heat resistant inorganic oxides. Examples of such a heat resistant inorganic oxide made of the composite oxide include silica-alumina.

With regard to alumina, in order to have excellent heat resistance and retain active species in a highly dispersed state during long-time use, γ-alumina having a high specific surface area is preferable. γ-Alumina has high heat resistance, is porous, and has a large specific surface area value. Consequently, γ-alumina has excellent dispersibility of Rh component.

The specific surface area value (measured by the BET method, hereinafter the same method will be employed) of such γ-alumina is preferably 80 m$^2$/g to 250 m$^2$/g and more preferably 100 m$^2$/g to 250 m$^2$/g. When the specific surface area value of γ-alumina is 250 m$^2$/g or smaller, the catalyst is rich in heat resistance, whereas when the specific surface area value is 80 m$^2$/g or larger, the noble metal component can be stabilized in a highly dispersed state. γ-alumina also exhibits an effect as a binder and thus peeling of the catalyst component can also be prevented when the catalyst component coats the honeycomb structure. Therefore, γ-alumina may be used not as the base material but may be used alone as a binder.

The base material is made to contain OSC such as cerium-zirconium composite oxide. Ce has the function of OSC material and thus oxygen storage amount increases. By containing such OSC, the oxidation activity is improved in an exhaust gas atmosphere having the low concentration of oxygen and the high concentrations of HC and CO. In the present invention, the Rh component is preferably supported on a mixture of alumina and cerium oxide or OSC such as cerium-zirconium composite oxide.

As described above, the content of cerium oxide in the entire catalyst is 7 [g/L] to 18 [g/L] in terms of CeO$_2$ per unit volume of the honeycomb structure. In this content, the amount of the cerium oxide in the lower layer is preferably 50% or larger and more preferably 60% or larger of the entire amount of the cerium oxide. When the amount of cerium oxide in the lower layer is set larger than that in the upper layer, the release rate of stored oxygen can be reduced and a region (window range) optimum to purify exhaust gas by TWC can be retained for a long time.

When cerium-zirconium composite oxide is used in combination with the heat resistant inorganic oxide such as γ-alumina and by mixing both of the substances, heat resistance and high dispersibility by γ-alumina and OSC performance of cerium-zirconium composite oxide are exhibited. Consequently, the activity of the Rh component is improved.

Here, when the Rh component is supported on the cerium-zirconium oxide like Rh/[CeO$_2$—ZrO$_2$], the Rh component exists in an active state as metal Rh. Removal of NOx by the steam reforming reaction at a high temperature is promoted by supporting Rh on zirconium oxide. When OSC is used as the base material of the Rh component, a base material such as cerium-zirconium composite oxide, which is the same base material as the base material used in the upper layer, may be used from the viewpoint of heat resistance of OSC.

In other words, the cerium-zirconium composite oxide is not particularly limited by the cerium content and the cerium-zirconium composite oxide having a cerium/zirconium ratio in terms of oxide of 0.5 to 0.9:1 is preferable. The oxygen that failed to be stored in the upper layer can be stored in the lower layer by using OSC containing such an amount of cerium. This enables the window range that is adequate to remove the hazardous components in the exhaust gas to be adequately retained and reduction of NOx to be promoted by the Rh component. Such a cerium-zirconium composite oxide may contain alkali metals, alkaline earth metals, transition metals, or rare earth metals other than cerium, if necessary.

In consideration of the amount of the cerium oxide, the amount of the cerium-zirconium composite oxide is determined. The content of the cerium-zirconium composite oxide in terms of the oxide per unit volume of the honeycomb structure is preferably 1 [g/L] to 150 [g/L]. The amount is more preferably 3 [g/L] to 100 [g/L] and particularly preferably 5 [g/L] to 50 [g/L]. When the amount of the cerium-zirconium composite oxide is within this range, the window range can be retained and the CO—NO reaction is not inhibited due to release of appropriate amount of oxygen from the cerium-zirconium composite oxide.

Lanthanum oxide is contained in the upper layer of the present invention and thus the lanthanum oxide is not contained or may be contained in a small content as the constituent component of the base material for the base material used in the lower layer.

The heat resistant inorganic oxide in the lower layer is contained in an amount of 50 [g/L] to 200 [g/L], more preferably 80 [g/L] to 150 [g/L], and further preferably 100 [g/L] to 140 [g/L]. When the total amount is within this range, the sections of the through holes of the honeycomb are not narrowed due to the thickness of the catalyst layer in the honeycomb structure and thus the back pressure does not rise excessively to cause the output to decrease. When the total amount is within this range, the dispersed state of the Rh component does not deteriorate and the activity of the catalyst does not decrease.

(Ba Component)

In the catalyst of the present invention, the Rh component is contained and the Ba component is not contained, or the Ba component is contained in a remarkably low content in the lower layer as with the upper layer. The amount of Ba component is preferably 1.2 g/L or smaller in terms of BaO per unit volume of the honeycomb structure.

The Ba component usable in the lower layer is the same component as component that can be used for the upper layer and action of the component is the same. When the Ba component exists in the same composition as the Rh component, however, the removal performance of NOx may be deteriorated in some cases. It is conceivable that the reason of this is because the alkaline earth metal component has an action of storing NOx and thus inhibits the removing action of NOx by the Rh component.

The Ba component, which is an alkaline earth metal, acts as a NOx storage component. The Ba component, however, inhibits desorption of NOx when the catalyst bed is at a low temperature from the start of engine start-up to a temperature of about 200° C. Therefore, the Ba component to be used is regulated in the present invention.

Desirably, the lower layer further contains a binder component. This is because when OSC as described above is used alone, bonding to the honeycomb structure described later becomes weak.

Examples of the binder component include various types of alumina such as γ-alumina, silica, zirconia, and silica-alumina. Of these binders, γ-alumina is known as activated alumina because γ-alumina has a large specific surface area value and high heat resistance. Various kinds of the materials can be obtained from the market. Zirconia is also known as a hydrogen generating material, and removal of NOx can be also expected in the present invention.

In the three-way catalyst of the present invention, the upper layer and the lower layer constitute the smallest catalyst composition constituting unit. Such layer constitution is desirable not only for the working efficiency but also for the cost. In the present invention, in addition to the two layers of the upper layer and the lower layer, however, a binder layer, a suppression layer to suppress migration of the catalyst component, a coating layer, or a different catalyst composition layer may be appropriately provided separately between the honeycomb structure and the lower layer, between the lower layer and the upper layer, or further on the upper layer, as long as the object of the present invention is not impaired.

In addition to the above essential components, the oxides of transition metals such as platinum, silver, copper, nickel, tungsten, vanadium, titanium, and tungsten; rare earth metals such as neodymium, praseodymium, and yttrium; alkali metals; and alkaline earth metals other than barium may be used as a single oxide or as composite oxide in the upper layer, the lower layer, and other layers, provided if necessary, of the present invention. Various zeolites and the like may also be used.

4. Honeycomb Structure

The honeycomb structure to be coated with the three-way catalyst of the present invention has a large number of through holes extending from one end face to the other end face and these through holes are gathered to form a honeycomb shape.

From the characteristics of its structure, the honeycomb structure has been known as a flow-through honeycomb structure and a wall-flow honeycomb structure. The wall-flow honeycomb structure is used in order to filter out solid components such as soot and SOF in the exhaust gas and is common as a diesel particulate filter (DPF) in the exhaust gas treatment application of diesel engines.

In recent years, collection and removal of soot components from exhaust gas have been required not only for diesel engines but also for gasoline engines, especially for direct injection gasoline-powered vehicles. The wall-flow honeycomb structure to which the catalyst components are applied may be used in order to purify the exhaust gas from gasoline engines. The wall-flow honeycomb structure has a structure in which one end of the through hole made of a porous wall is alternately sealed and has a function as a filter in order to filter particulate components such as soot. Such a particulate matter (PM) filter for a gasoline engine is referred to as gasoline particulate filter (GPF).

In contrast, the flow-through honeycomb structure has a structure having a large number of through holes opening from one open end face to the other open ends face. Since the present invention is used for TWC, either the flow-through honeycomb structure or the wall-flow honeycomb structure can be used.

The density of the through holes in such a honeycomb structure is represented by the number of holes per unit sectional area, which is also called a cell density. The cell density of the flow-through honeycomb structure is preferably about 100 cells/inch$^2$ to 1,200 cells/inch$^2$ (15.5 cells/cm$^2$ to 186 cells/cm$^2$) and more preferably 400 cells/inch$^2$ to 900 cells/inch$^2$ (62 cells/cm$^2$ to 140 cells/cm$^2$). When the cell density is higher than 1,200 cells/inch$^2$, clogging tends to occur due to the catalyst component or the solid content in the exhaust gas, whereas when the cell density is lower than 100 cells/inch$^2$, the geometric surface area becomes small and thus the effective use ratio of the catalyst tends to decrease.

The thickness of the cell wall constituting the honeycomb of the flow-through honeycomb structure is preferably 1 mil (milli-inch) to 12 mil (0.025 mm to 0.3 mm), more preferably 2 mil to 8 mil (0.05 mm to 0.2 mm), and more desirably 2 mil to 5 mil (0.05 mm to 0.125 mm). When the cell wall is excessively thin, the honeycomb becomes structurally brittle, whereas when the cell wall is excessively thick, the geometric surface area of the cell becomes small and thus the effective use ratio of the catalyst tends to decrease.

The cell density of the wall-flow honeycomb structure is usually smaller than that of the flow-through honeycomb structure because the wall-flow honeycomb structure is more porous than the flow-through honeycomb structure and is preferably about 100 cells/inch$^2$ to about 1,200 cells/inch$^2$ (about 15.5 cells/cm$^2$ to about 186 cells/cm$^2$), more preferably about 150 cells/inch$^2$ to about 600 cells/inch$^2$ (about 23 cells/cm$^2$ to about 93 cells/cm$^2$), and more preferably about 200 cells/inch$^2$ to about 400 cells/inch$^2$ (about 31 cells/cm$^2$ to about 62 cells/cm$^2$).

The thickness of the partition wall that is the cell wall constituting the honeycomb of the wall-flow honeycomb structure is generally thicker than the partition wall of the flow-through honeycomb structure because the wall-flow honeycomb structure is more porous than the flow-through honeycomb structure. The thickness is preferably 1 mil to 18 mil (0.025 mm to 0.47 mm) and more preferably 6 mil to 12 mil (0.16 mm to 0.32 mm).

A form of the wall-flow honeycomb structure coated with wash coating is not particularly limited. The catalyst layer may be formed in the pores inside the partition wall or the catalyst layer may be formed on the partition wall. For example, one of the two or more catalyst layers of the present invention may be formed inside the partition wall and the other catalyst layer may be formed on the partition wall.

5. Catalyst Preparation (Wash Coating Method)

The three-way catalyst of the present invention is produced by preparing the catalyst composition slurry containing the catalyst component and the honeycomb structure (carrier) and separately applying the predetermined catalyst components onto a carrier in the form of the layers.

More specifically, in the present invention, the catalyst composition slurry containing the heat resistant inorganic oxide supporting Rh is applied onto a honeycomb structure and subsequently the catalyst composition slurry containing the heat resistant inorganic oxide supporting Pd and La compound is applied onto the coated honeycomb structure and the applied slurries are dried and calcined to coat the carrier formed of the honeycomb structure with the catalyst compositions by a wash coating method.

The wash coating method is a method of obtaining a honeycomb structure type catalyst coated with the catalyst compositions by applying the catalyst compositions to the honeycomb structure and thereafter drying and calcining the applied catalyst compositions. First, a heat resistant inorganic oxide base material such as alumina and cerium-zirconium composite oxide is impregnated with a solution containing the Rh component and the honeycomb structure is coated with the catalyst composition slurry to form a catalyst layer (lower layer). The Rh component is supported on one or a mixture of two or more of the heat resistant inorganic oxides. The calcination after the impregnation is optional.

Subsequently, the treated honeycomb structure is coated with the layer (the upper layer) containing palladium supported on the heat resistant inorganic oxide base material and a surface layer side catalyst layer containing alumina, cerium-zirconium composite oxide, and the La compound.

The La compound to be used as a raw material is not limited by its kind. The raw material easily dissolved in a slurrying solvent is preferable and inorganic compounds such as La nitrate, La sulfate, La chloride, La carbonate, La phosphate, and La hydroxide and organic compounds such as La acetate, La oxalate, La laurate, and La stearate can be used. In particular, La nitrate, La acetate, La carbonate, and La hydroxide are preferable. The La compound is used in such an amount that the amount of La oxide to be supported is 9.6 g/L to 23 g/L in terms of $La_2O_3$ per unit volume of the honeycomb structure.

In the present invention, the amount of La oxide to be supported is preferably 9.6 g/L to 20 g/L and more preferably 10 g/L to 19 g/L in terms of $La_2O_3$ per unit volume of the honeycomb structure. Although the amount of La oxide is correlated with the catalyst performance, other requirements are also required to be considered. By optimizing the type of the La compound, supporting conditions, and the like, the removal rates of any CO, HC, and NOx can be surely improved with reduced manufacturing cost.

The barium component can be contained in either or both layers. Even when the barium component is contained, the amount of the barium component is set to the specific amount or smaller.

The catalyst composition slurry having a viscosity suitable for coating is used. The viscosity is 300 CPS to 2,000 CPS and preferably 500 CPS to 1,000 CPS as the values measured with a B type viscometer. With such catalyst composition slurry, the entire inside of the honeycomb structure can be coated by means of the wash coating method. In order to lower the viscosity of the high viscosity slurry, a water content is required to be increased. However, when the slurry in which the water content is increased is used, the amount of the catalyst that is able to coat the honeycomb structure by single wash coating is decreased and thus a plurality of times of wash coatings are required in order to coat the honeycomb structure with the amount of catalyst required to form one kind of the catalyst composition layer.

After the catalyst composition is applied, the honeycomb structure is dried and calcined. The drying temperature is preferably 100° C. to 300° C. and more preferably 100° C. to 200° C. The calcining temperature is preferably 300° C. to 700° C. and particularly preferably 400° C. to 600° C. Heating can be carried out by known heating means such as an electric furnace and a gas furnace.

In the case of coating the honeycomb structure with the multiple layers of the catalysts, the wash coating method may be repeated two or more times. The application before the drying step may be repeated two or more times or the process of the application to the drying step may be repeated two or more times.

6. Method to Purify Exhaust Gas

The three-way catalyst of the present invention is used by arranging the catalyst in the exhaust gas flow of a gasoline-powered vehicle.

In order to arrange the three-way catalyst of the present invention in the exhaust gas flow, the catalyst may be arranged alone, a plurality of numbers of the catalysts may be used, or the catalyst may be used together with a catalyst having different action. When a plurality of numbers of the catalysts are used, these catalysts may be arranged adjacent to each other or may be arranged directly below the engine and under the floor of the chassis.

The place for the catalyst directly below the engine is not limited to the place adjacent to the engine and may be arrange in a place having a certain distance. The three-way catalyst of the present invention may be used either directly below the engine or under the floor of the chassis. In some cases, however, the catalyst may be preferably used under the floor or at a position not adjacent to the engine, where the temperature of the catalyst hardly rises. When the three-way catalyst of the present invention is used under the floor, another three-way catalyst may be arranged directly below the engine.

The three-way catalyst of the present invention is applied to gasoline-powered vehicles and can also be used for diesel-powered vehicles. The exhaust gas exhausted from diesel-powered vehicles contains HC, CO, and NOx but the catalytic effect of the present invention is not significantly influenced by the concentrations thereof. The temperature of the exhaust gas exhausted from a diesel engine for an automotive has a wide range. When the temperature is classified into a low temperature range approximately in the range of 150° C. to 250° C. and a high temperature range approximately in the range of 300° C. to 600° C., the catalyst of the present invention is able to exhibit high denitrification performance over a wide temperature range from the low temperature range to the high temperature range.

In recent years, further improvement of fuel consumption has become a significant problem even in gasoline-powered vehicles. In order to improve the fuel consumption, in gasoline-powered vehicles, the air/fuel ratio of the air-fuel mixture (air-fuel ratio or A/F) supplied to the combustion chamber is increased or the fuel supply may be temporarily stopped. By this operation, lean combustion of the fuel is carried out in the gasoline engine and the amount of NOx generated increases. The three-way catalyst of the present invention is able to remove HC, CO, and NOx with high efficiency. In particular, the catalyst has excellent NOx removal performance and thus has been suitable for purification of exhaust gas exhausted from a gasoline-powered vehicle of recent low fuel consumption specification.

Figure 1:
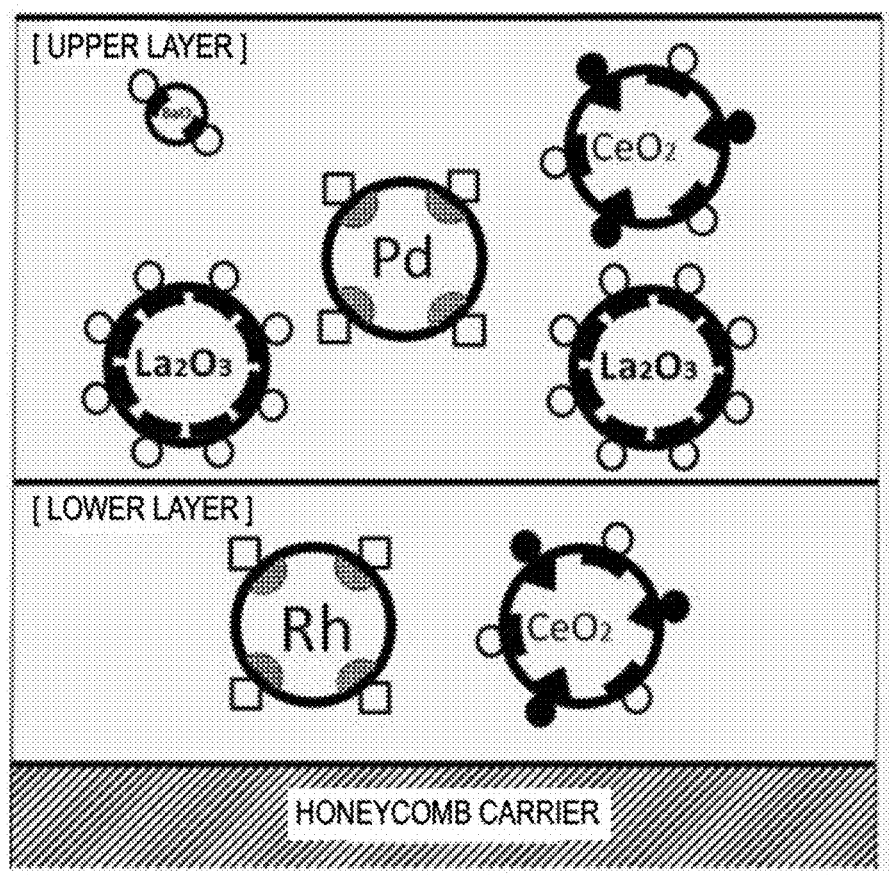
FIG. 1 is an explanatory view of a three-way catalyst of the present invention made of two layers of the upper layer and the lower layer schematically illustrating the composition of catalyst components and assuming CO—NO reaction when exhaust gas is treated at lower than 200° C.

The catalyst of the present invention has the structure as illustrated in FIG. 1 and exhibits excellent exhaust gas purification performance at a low temperature. Although the reason is uncertain, the basic catalyst function will be conceptually described using the case where the catalyst is used to purify the exhaust gas exhausted from a gasoline engine as an example.

Although various reactions proceed with the three-way catalyst, attention is now paid to the reaction of CO and NOx, which is one of the main actions of the present invention. NOx in the exhaust gas is composed of various components such as NO, $NO_2$, and $N_2O$. Of these components, the composition amount of NO is the largest.

In the catalyst of the present invention, the amount of BaO is remarkably smaller than the amount in the conventional catalyst and the amount of $La_2O_3$ is larger instead. As illustrated in FIG. 1, the state of the catalyst components and the exhaust gas components having a catalyst temperature of lower than 200° C. is the same as that of the conventional FIG. 2(A).

Figure 3:
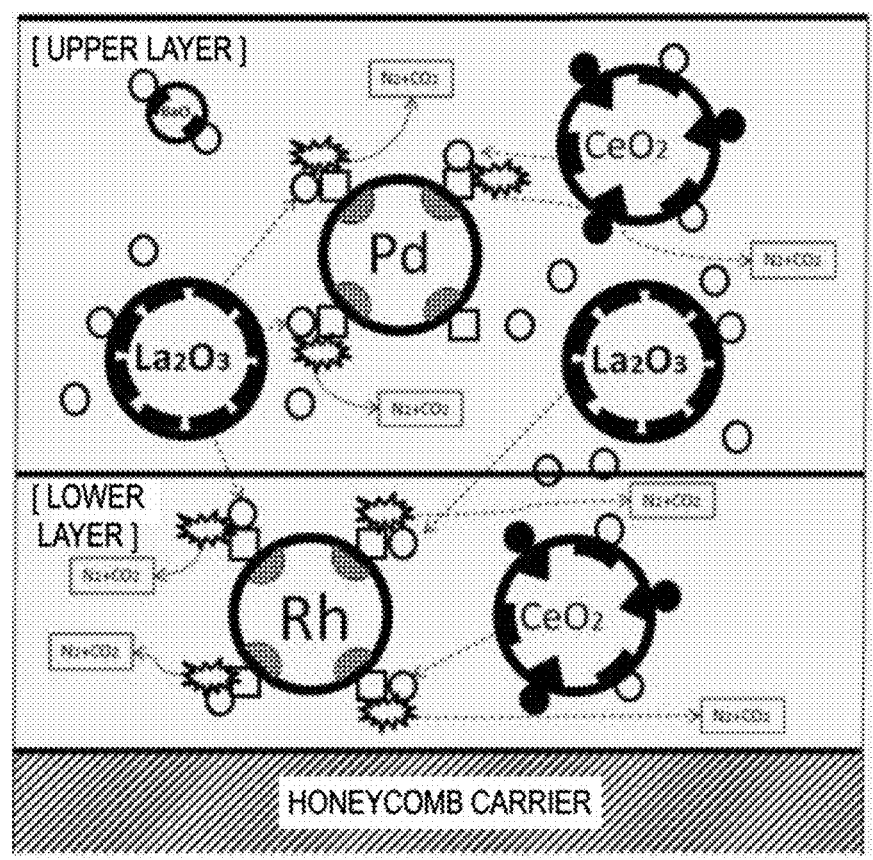
FIG. 3 is an explanatory view schematically illustrating the CO—NO reaction mechanism when the exhaust gas is treated at 200° C. or higher using the three-way catalyst of the present invention to which Ba is added in a slight amount.

However, in FIG. 3 illustrating the state where the catalyst temperature rises above 200° C., the amount of NOx released from low temperature increases due to an increase in the amount of $La_2O_3$. This increased NO actively reacts with CO on the adsorption sites of Pd and Rh and the CO—NO reaction is promoted. As the CO—NO reaction is promoted, the temperature of the catalyst also rises sharply. Therefore, the temperature of the catalyst bed can be raised even when the exhaust gas itself is still in a low temperature state and thus excellent purification performance can be exhibited. Although the OSC material used in the present invention buffers the oxygen concentration on the catalyst, in order to promote the steam reforming reaction promoted at a high temperature, cerium-zirconium composite oxide is preferably used rather than pure cerium oxide.

As described above, according to the catalyst of the present invention, the removal performance of NOx at the low temperature (approximately 200° C. to 400° C.) can be improved and the temperature reaches the widely known active region of the steam reforming reaction at the high temperature (approximately 400° C. or higher) and thus the uniform NOx removal for the wide range of exhaust gas temperatures in the practical field of automobiles is possible.

EXAMPLE

Hereinafter, Examples and Comparative Examples of the present invention will be described. The present invention, however, is not interpreted as being limited to Examples.

Example 1

First, Rh-supported $Al_2O_3$, Rh-supported $CeO_2$—$ZrO_2$ composite oxide, Pd-supported $Al_2O_3$, and Pd supported $CeO_2$—$ZrO_2$ composite oxide of the catalyst composition were prepared in the following manner. The amount of various raw materials used was determined so that the composition listed in Example 1 in Table 1 was obtained when a catalyst layer was formed on a honeycomb support. In Table 1, [Ce/Zr] represents a $CeO_2$—$ZrO_2$ composite oxide having a composition ratio of 40:55 in terms of weight as oxide. Hereinafter, the same is applied to Examples and Comparative Examples.

<Rh-Supported $Al_2O_3$>

A rhodium nitrate solution diluted with pure water was impregnated and supported on commercially available γ-alumina powder. This solution-containing powder was calcined in air at 500° C. for 1 hour to prepare Rh-supported $Al_2O_3$.

<Rh-Supported $CeO_2$—$ZrO_2$ Composite Oxide>

The rhodium nitrate solution diluted with pure water was impregnated and supported on 40.0% by weight of commercially available [Ce/Zr] powder. This solution-containing powder was calcined in air at 500° C. for 1 hour to prepare Rh-supported $CeO_2$—$ZrO_2$ composite oxide.

<Pd-Supported $Al_2O_3$>

A palladium nitrate solution diluted with pure water was impregnated and supported on commercially available γ-alumina powder. This solution-containing powder was calcined in air at 500° C. for 1 hour to prepare Pd-supported $Al_2O_3$.

<Pd-Supported $CeO_2$—$ZrO_2$ Composite Oxide>

The palladium nitrate solution diluted with pure water was impregnated and supported on 40.0% by weight of commercially available [Ce/Zr] powder. This solution-containing powder was calcined in air at 500° C. for 1 hour to prepare Pd-supported $CeO_2$—$ZrO_2$ composite oxide.

A catalyst layer was formed on a honeycomb carrier using the noble metal supported powder. The amounts of the various noble metal supported powders used were determined so that the compositions listed in Example 1 in Table 1 were obtained.

<Formation of Rh Catalysis Layer>

The Rh-supported $Al_2O_3$ and the Rh-supported [Ce/Zr] powder were charged into a pot mill together with pure water in the amount in which a solid content was 45% by weight, and thereafter mixed and pulverized to prepare slurry. A cordierite honeycomb carrier having a capacity of 0.7 L (600 cells/inch$^2$, 4 mils) was coated with this slurry as the lower layer to give the lower Rh catalyst layer (Rh catalyst layer weight: 125.35 g/L, Rh in this layer: 0.35 g/L).

<Formation of Pd Catalyst Layer>

Subsequently, the slurry was prepared by charging lanthanum nitrate, Pd-supported $Al_2O_3$, and Pd-supported [Ce/Zr] powder into a pot mill mixing together with pure water in an amount so that the solid content is 45% by weight, and pulverizing the mixture. The above cordierite honeycomb carrier that was previously coated with the Rh catalysis layer of the lower layer was coated with this slurry and the coated honeycomb carrier was dried at 150° C. for 2 hours and then calcined at 550° C. for 0.5 hour to give the upper Pd catalyst layer (Pd catalyst layer weight: 83 g/L, Pd in this layer: 3.5 g/L).

Thereafter, engine durability treatment of this honeycomb catalyst was carried out by the following method and the catalyst performance test was carried out on an actual vehicle.

<Engine Durability Treatment>

The honeycomb catalyst obtained above was thermally treated at 950° C. for 200 hours using a stoichiometric gasoline engine.

<Catalyst Performance Test Using Actual Vehicle>

Figure 4:
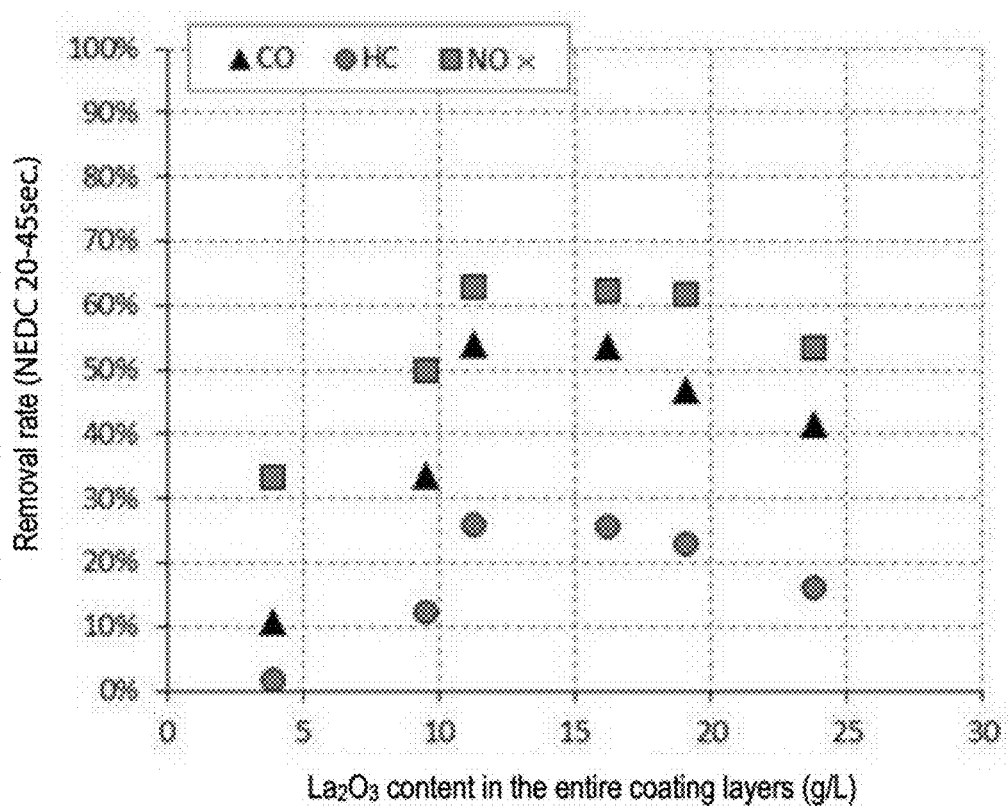
FIG. 4 is a graph illustrating the result obtained by testing catalyst performance with the supported amounts of La of the three-way catalyst of the present invention and a catalyst for comparison being changed.

The honeycomb catalyst after the engine durability treatment was mounted on the catalytic converter and the exhaust gas purification performance of the catalyst was examined in the NEDC mode in FIG. 4 using a domestically produced gasoline-powered vehicle (1.5 LN/A). CO, HC, and NOx in the exhaust gas for 20 seconds to 45 seconds after the engine start-up were analyzed and the removal rates were calculated by the following formula. The results are listed in Table 1 and illustrated in FIG. 4.

Each removal rate (%) of CO, HC, and NOx=[pre-catalyst gas (g)−post-catalyst gas (g)]/pre-catalyst gas (g)×100

(Examples 2 and 3) (Comparative Examples 1 to 3)

With respect to Example 1 above, in forming the Pd catalyst layer, a catalyst samples in which La nitrate was increased or decreased and the amount of supported La was varied as listed in Table 1 were prepared. Subsequently, using the obtained catalyst samples, the removal performances of CO, HC, and NOx were measured in the same manner as in Example 1. The results are listed in Table 1 and illustrated in FIG. 4.

TABLE 1

|  |  | Comparative Example 1 | Comparative Example 2 | Example 1 | Example 2 | Example 3 | Comparative Example 3 |
|---|---|---|---|---|---|---|---|
| Upper layer [g/L] (in terms of oxide) | Pd (metal) | 3.5 | 3.5 | 3.5 | 3.5 | 3.5 | 3.5 |
|  | γ-alumina | 60 | 60 | 60 | 60 | 60 | 60 |
|  | Ce/Zr | 10 | 10 | 10 | 10 | 10 | 10 |
|  | $La_2O_3$ | 3.9 | 9.5 | 11.3 | 16.2 | 19.1 | 23.8 |
| Lower layer [g/L] (in terms of oxide) | Rh (metal) | 0.35 | 0.35 | 0.35 | 0.35 | 0.35 | 0.35 |
|  | γ-alumina | 100 | 100 | 100 | 100 | 100 | 100 |
|  | Ce/Zr | 25 | 25 | 25 | 25 | 25 | 25 |
| Total [g/L] | $CeO_2$ | 14 | 14 | 14 | 14 | 14 | 14 |
|  | $La_2O_3$ | 3.9 | 9.5 | 11.3 | 16.2 | 19.1 | 23.8 |
| NEDC (20-45 seconds) Removal rate [%] | CO | 11 | 33.5 | 54 | 53.7 | 46.9 | 41.7 |
|  | HC | 1.7 | 12.3 | 26 | 25.6 | 23 | 16 |
|  | NOx | 33.3 | 49.8 | 63 | 62.4 | 61.8 | 53.3 |

[Evaluation]

As is clear from Table 1, in Examples 1 to 3, the amounts of contained $La_2O_3$ were 9.6 g/L or larger in the catalyst compositions and high removal rates of any of NOx, CO, and HC were obtained. On the other hand, the amounts of $La_2O_3$ were smaller than 9.6 g/L in Comparative Examples 1 and 2, while the amount of $La_2O_3$ is larger than 23 g/L in Comparative Example 3. Consequently, Comparative Examples indicate lower removal rates of any of NOx, CO, and HC than those in Examples.

(Example 4) (Comparative Examples 4 and 5)

With respect to Example 1, a catalyst sample was prepared in which 0.6 g/L of Ba in terms of oxides was supported on each of the upper layer and the lower layer as listed in Table 2. As Ba, barium nitrate was used as a raw material and added to the slurry to prepare the catalyst of Example 4.

Figure 5:
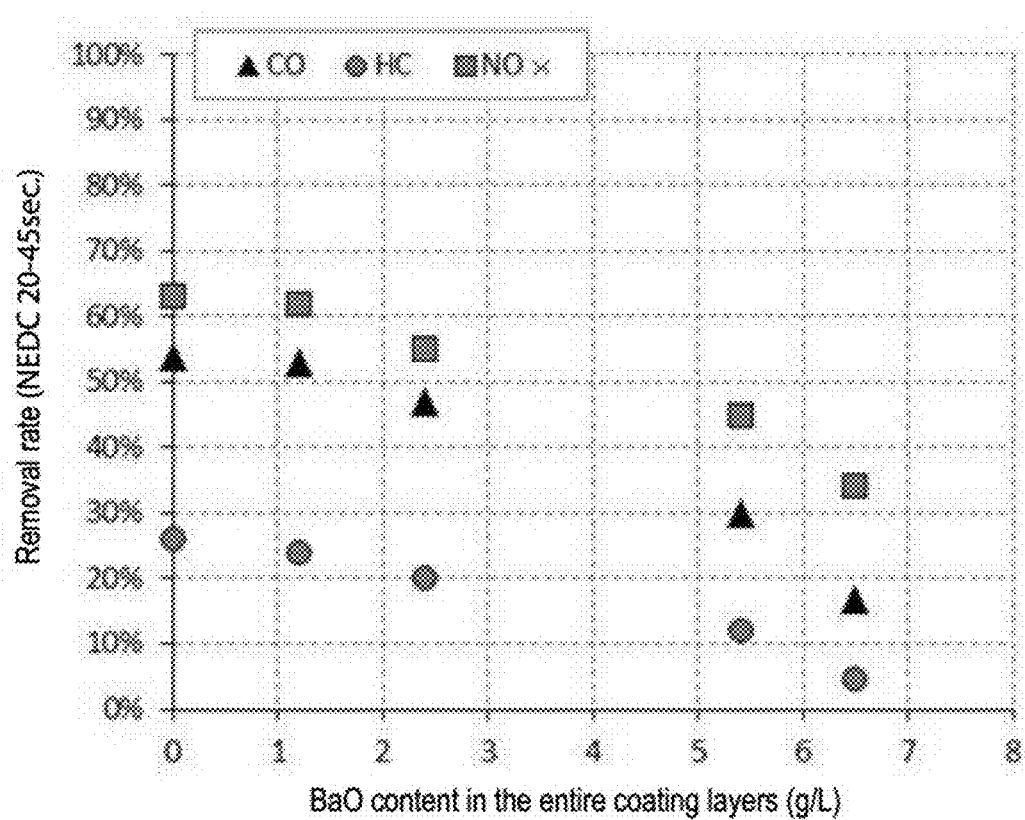
FIG. 5 is a graph illustrating the result obtained by testing catalyst performance with the supported amount of Ba of the three-way catalyst of the present invention and a catalyst for comparison being changed.

Similarly, as listed in Table 2, catalyst samples were prepared in which Ba was supported in an amount of 1.2 g/L or 2.7 g/L in terms of oxide in each of the upper layer and the lower layer. The removal performances of CO, HC, and NOx were measured. The results are listed in Table 2 and illustrated FIG. 5 together with Example 1.

TABLE 2

|  |  | Example 1 | Example 4 | Comparative Example 4 | Comparative Example 5 |
|---|---|---|---|---|---|
| Upper layer [g/L] | Pd (metal) | 3.5 | 3.5 | 3.5 | 3.5 |
|  | γ-alumina | 60 | 60 | 60 | 60 |

TABLE 2-continued

|  |  | Example 1 | Example 4 | Comparative Example 4 | Comparative Example 5 |
|---|---|---|---|---|---|
| (in terms of oxide) | Ce/Zr | 10 | 10 | 10 | 10 |
|  | $La_2O_3$ | 11.3 | 11.3 | 11.3 | 11.3 |
|  | BaO | 0 | 0.6 | 1.2 | 2.7 |
| Lower layer [g/L] | Rh (metal) | 0.35 | 0.35 | 0.35 | 0.35 |
|  | γ-alumina | 100 | 100 | 100 | 100 |
| (in terms of oxide) | Ce/Zr | 25 | 25 | 25 | 25 |
|  | BaO | 0 | 0.6 | 1.2 | 2.7 |
| Total [g/L] | $CeO_2$ | 14 | 14 | 14 | 14 |
|  | $La_2O_3$ | 11.3 | 11.3 | 11.3 | 11.3 |
|  | BaO | 0 | 1.2 | 2.4 | 5.4 |
| NEDC (20-45 seconds) Removal rate [%] | CO | 54 | 53 | 47 | 30 |
|  | HC | 26 | 24 | 20 | 12 |
|  | NOx | 63 | 62 | 55 | 45 |

[Evaluation]

As is clear from Table 2, in Example 4, the catalyst composition contained a total of 1.2 g/L of BaO. Although the removal rates were not so high as in Example 1, high removal rates were obtained for any of NOx, CO, and HC. On the other hand, in Comparative Examples 4 and 5, BaO was contained in total amounts of more than 2 g/L and the removal rates of any of NOx, CO, and HC were lower than those in Examples.

(Examples 5 to 7) (Comparative Example 6 and 7)

With respect to Example 1 above, catalyst samples in which the amounts of $CeO_2$ in the lower layers were varied as listed in Table 3 and that supported 10.5 g/L to 31 g/L of $CeO_2$ in terms of oxide were used as the catalysts in Examples 5 to 7.

Figure 6:
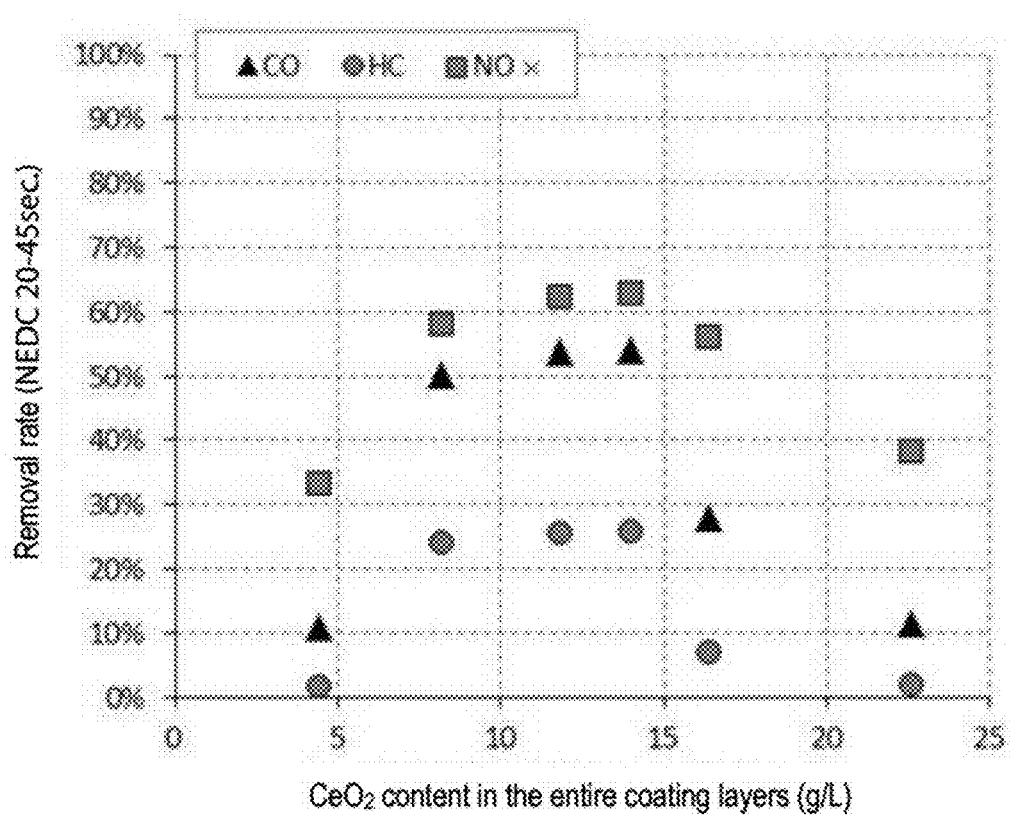
FIG. 6 is a graph illustrating the result obtained by testing catalyst performance with the supported amount of Ce of the three-way catalyst of the present invention and a catalyst for comparison being changed.

Similarly, catalyst samples of Comparative Examples 6 and 7 in which the amounts of Ce/Zr in the lower layers were varied as listed in Table 2 and that supported $CeO_2$ in total of 1 g/L and 46.5 g/L were prepared. The removal performances of CO, HC, and NOx were measured. The results are listed in Table 3 and illustrated FIG. 6 together with Example 1.

Examples 6 and 7, $CeO_2$ was contained in an amount of smaller than 7 g/L or larger than 20 g/L and the removal rates of any of NOx, CO, and HC were lower than those in Examples.

INDUSTRIAL APPLICABILITY

The present invention is a catalyst constitution that contains a specific amount of $La_2O_3$ and $CeO_2$, does not contain BaO or contains BaO in a specific amount or smaller, and contains Pd in the upper layer and Rh in the lower layer. The catalyst constitution has excellent performance in which exhaust gas is purified even at a relatively low temperature from gasoline engine startup and is useful as a three-way catalyst to simultaneously remove nitrogen oxides, hydrocarbons, and carbon monoxide.

The invention claimed is:

1. A three-way catalyst for purifying gasoline engine exhaust gas, the three-way catalyst comprising:
   a carrier having a honeycomb structure, and
   a first catalyst layer and a second catalyst layer on the carrier to remove carbon monoxide, hydrocarbons, and nitrogen oxides in gasoline engine exhaust gas,
   wherein:
   the first catalyst layer is composed of a first catalyst composition comprising a heat resistant inorganic oxide supporting Pd and a La-containing oxide,
   the second catalyst layer is composed of a second catalyst composition comprising a heat resistant inorganic oxide supporting Rh,
   the first catalyst layer is disposed farther from the carrier than the second catalyst layer,
   the heat resistant inorganic oxide in at least one of the first catalyst composition and the second catalyst composition comprises a Ce-containing oxide, and
   in the three-way catalyst, a content of La in terms of $La_2O_3$ is 9.6 g/L to 23 g/L, and a content of Ce in terms of $CeO_2$ is 5 g/L to 20 g/L.

2. The three-way catalyst for purifying gasoline engine exhaust gas according to claim 1, wherein the first catalyst

TABLE 3

|  |  | Comparative Example 6 | Example 5 | Example 6 | Example 1 | Example 7 | Comparative Example 7 |
|---|---|---|---|---|---|---|---|
| Upper layer [g/L] | Pd (metal) | 3.5 | 3.5 | 3.5 | 3.5 | 3.5 | 3.5 |
|  | γ-alumina | 60 | 60 | 60 | 60 | 60 | 60 |
| (in terms of oxide) | Ce/Zr | 10 | 10 | 10 | 10 | 10 | 10 |
|  | $La_2O_3$ | 11.3 | 11.3 | 11.3 | 11.3 | 11.3 | 11.3 |
| Lower layer [g/L] | Rh (metal) | 0.35 | 0.35 | 0.35 | 0.35 | 0.35 | 0.35 |
|  | γ-alumina | 100 | 100 | 100 | 100 | 100 | 100 |
| (in terms of oxide) | Ce/Zr (A) | 1 | 10.5 | 19.5 | 25 | 31 | 46.5 |
| Total [g/L] | $CeO_2$ | 4.4 | 8.2 | 11.8 | 14 | 16.4 | 22.6 |
|  | $La_2O_3$ | 11.3 | 11.3 | 11.3 | 11.3 | 11.3 | 11.3 |
| NEDC (20-45 seconds) Removal rate [%] | CO | 11 | 50.3 | 53.7 | 54 | 27.9 | 11.4 |
|  | HC | 1.7 | 24.2 | 25.6 | 26 | 6.9 | 1.9 |
|  | NOx | 33.3 | 58.2 | 62.4 | 63 | 56 | 38.3 |

[Evaluation]

As is clear from Table 3, in Examples 5 to 7, $CeO_2$ is contained in the catalyst compositions in an amount of 8 g/L to 17 g/L and high removal rates are obtained for any of NOx, CO, and HC. On the other hand, in Comparative composition alone comprises the La-containing oxide and the content of La in terms of $La_2O_3$ is 9.6 g/L to 20 g/L.

3. The three-way catalyst for purifying gasoline engine exhaust gas according to claim 1, wherein the heat resistant inorganic oxide in the first catalyst composition is one or more heat resistant inorganic oxides selected from the group consisting of γ-alumina, γ-alumina to which La is added, ceria, cerium-zirconium composite oxide, and cerium-zirconium composite oxide to which La is added.

4. The three-way catalyst for purifying gasoline engine exhaust gas according to claim 1, wherein a content of Pd is 0.1 g/L to 12 g/L per unit volume of the honeycomb structure.

5. The three-way catalyst for purifying gasoline engine exhaust gas according to claim 1, wherein at least one of the first catalyst composition and the second catalyst composition further comprises a Ba component, and a content of Ba in terms of BaO is no more than 0.1 g/L per unit volume of the honeycomb structure.

6. The three-way catalyst for purifying gasoline engine exhaust gas according to claim 1, wherein the heat resistant inorganic oxide in the first catalyst composition comprises cerium-zirconium composite oxide in a content of 1 g/L to 50 g/L per unit volume of the honeycomb structure.

7. The three-way catalyst for purifying gasoline engine exhaust gas according to claim 1, wherein a content of Rh is 0.01 g/L to 3 g/L per unit volume of the honeycomb structure.

8. The three-way catalyst for purifying gasoline engine exhaust gas according to claim 1, wherein the heat resistant inorganic oxide in the second catalyst composition comprises cerium-zirconium composite oxide in a content of 5 g/L to 100 g/L per unit volume of the honeycomb structure.

9. The three-way catalyst for purifying gasoline engine exhaust gas according to claim 1, wherein at least one of the first catalyst composition and the second catalyst composition does not comprise Ba and wherein the first catalyst composition does not comprise Rh.

10. The three-way catalyst for purifying gasoline engine exhaust gas according to claim 1, wherein the first catalyst composition and the second catalyst composition do not comprise Ba.

11. The three-way catalyst for purifying gasoline engine exhaust gas according to claim 1, wherein at least one of the first catalyst composition and the second catalyst composition further comprises a Ba component, and a content of Ba in terms of BaO is no more than 1.2 g/L per unit volume of the honeycomb structure.

* * * * *